(12) United States Patent
McSherry et al.

(10) Patent No.: US 7,739,356 B2
(45) Date of Patent: Jun. 15, 2010

(54) GLOBAL AND LOCAL ENTITY NAMING

(75) Inventors: Frank D. McSherry, San Francisco, CA (US); Ulfar Erlingsson, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 739 days.

(21) Appl. No.: 11/305,418

(22) Filed: Dec. 16, 2005

(65) Prior Publication Data

US 2007/0143437 A1 Jun. 21, 2007

(51) Int. Cl.
*G06F 15/16* (2006.01)
(52) U.S. Cl. ............... 709/218; 709/217; 709/220; 709/230; 709/245
(58) Field of Classification Search ............. 709/217, 709/220, 230, 245, 218
See application file for complete search history.

(56) References Cited

U.S. PATENT DOCUMENTS

| | | | |
|---|---|---|---|
| 2003/0212824 A1* | 11/2003 | Yoshizawa et al. ......... | 709/245 |
| 2005/0262050 A1* | 11/2005 | Fagin et al. ................ | 707/3 |
| 2006/0122972 A1* | 6/2006 | Keohane et al. ............ | 707/3 |
| 2006/0275934 A1* | 12/2006 | Pohl et al. ................. | 438/14 |
| 2007/0050478 A1* | 3/2007 | Hickman et al. ........... | 709/219 |
| 2007/0103477 A1* | 5/2007 | Paquette et al. ........... | 345/545 |
| 2007/0118620 A1* | 5/2007 | Cartmell et al. ........... | 709/219 |

* cited by examiner

*Primary Examiner*—Thu Nguyen
*Assistant Examiner*—Lan-Dai T Truong
(74) *Attorney, Agent, or Firm*—Woodcock Washburn LLP

(57) ABSTRACT

An improved entity naming scheme employs the use of two sets of names: local names and global names. The local and global naming scheme may be applied to entities that are assigned to a number of different global compartments. Local entities are entities that are assigned to the same compartment, while non-local entities are entities that are assigned to different compartments. Each entity is assigned a local name that is unique among all local entities. Additionally, a number of global entities are identified. Global entities are entities that are referenced by one or more non-local entities. Each global entity is assigned a global name that is unique among all global entities.

13 Claims, 5 Drawing Sheets

| Global Name Table 10 ||
|---|---|
| Page | Global Name |
| www.compartment-a.com | 1 |
| www.compartment-b.com | 2 |
| www.compartment-b.com/page-b | 3 |
| www.compartment-c.com | 4 |

| Compartment A Local Name Table 20a ||
|---|---|
| Page | Local Name |
| www.compartment-a.com | 1 |
| www.compartment-a.com/page-a | 2 |
| www.compartment-a.com/page-b | 3 |

| Compartment B Local Name Table 20b ||
|---|---|
| Page | Local Name |
| www.compartment-b.com | 1 |
| www.compartment-b.com/page-a | 2 |
| www.compartment-b.com/page-b | 3 |
| www.compartment-b.com/page-c | 4 |

| Compartment C Local Name Table 20c ||
|---|---|
| Page | Local Name |
| www.compartment-c.com | 1 |
| www.compartment-c.com/page-a | 2 |
| www.compartment-c.com/page-b | 3 |
| www.compartment-c.com/page-c | 4 |
| www.compartment-c.com/page-d | 5 |

Fig. 1

| Global Name Table 10 ||
|---|---|
| Page | Global Name |
| www.compartment-a.com | 1 |
| www.compartment-b.com | 2 |
| www.compartment-b.com/page-b | 3 |
| www.compartment-c.com | 4 |

| Compartment A Local Name Table 20a ||
|---|---|
| Page | Local Name |
| www.compartment-a.com | 1 |
| www.compartment-a.com/page-a | 2 |
| www.compartment-a.com/page-b | 3 |

| Compartment B Local Name Table 20b ||
|---|---|
| Page | Local Name |
| www.compartment-b.com | 1 |
| www.compartment-b.com/page-a | 2 |
| www.compartment-b.com/page-b | 3 |
| www.compartment-b.com/page-c | 4 |

| Compartment C Local Name Table 20c ||
|---|---|
| Page | Local Name |
| www.compartment-c.com | 1 |
| www.compartment-c.com/page-a | 2 |
| www.compartment-c.com/page-b | 3 |
| www.compartment-c.com/page-c | 4 |
| www.compartment-c.com/page-d | 5 |

…
GLOBAL AND LOCAL ENTITY NAMING

BACKGROUND

In conventional computing applications, it is often necessary to assign names to a number of entities. The term "entity," as used herein, refers to anything to which a name can be assigned such as, for example, a page, a location, a document, a recipient, or an address. Names may be strictly numeric, or may include numbers, letter, symbols, other characters, or any combination thereof. Web page ranking is a common scenario in which it is necessary to assign names to entities. In particular, during web page ranking, a score is repeatedly propagated from a current page to the recipient pages that are pointed to by the current page. The current page may be considered to "point" to a recipient page if, for example, the current page has a uniform resource locator (URL) or another link that points to the recipient page. For example, if a current page has a score of 30, and the current page points to three recipient pages, then a score of 10 points each may be propagated from the current page to each of the three recipient pages to which it points. In such an iterative process, it is important to have immediate access to each of the recipient pages so that the score can be immediately propagated from the current page to the recipient pages. A common technique for providing this immediate access is to store a score in random access memory (RAM) for each of the recipient pages. To easily access these scores, each page is assigned a numeric name that describes where in RAM that score is located.

One of the challenges related to entity naming schemes is that, in conventional computing applications, the number of total entities to which names must be assigned is often quite large. For example, for web page ranking, it may currently be necessary to assign 20 billion or more names, with the number of existing web pages continuing to rapidly increase. Because a program may demand access to any of the named pages, the amount of memory required to be active is typically proportional to the number of named pages. Thus, for example, between 80 and 320 gigabytes or more of active memory may be required for 20 billion names. This greatly exceeds the capacity of any one computer and necessitates a complicated memory distribution implementation.

SUMMARY

An improved entity naming scheme employs the use of two sets of names: local names and global names. The local and global naming scheme may be applied to entities that are assigned to a number of different compartments. Local entities are entities that are assigned to the same compartment, while non-local entities are entities that are assigned to different compartments. Each entity is assigned a local name that is unique among all local entities. Additionally, a number of global entities are identified. Global entities are entities that are referenced by one or more non-local entities. Each global entity is assigned a global name that is unique among all global entities. Thus, whenever a global entity is referenced by a non-local entity, the global entity can be easily identified by its global name. Additionally, whenever a global or non-global entity is referenced by a local entity, the global or non-global entity can be easily identified by its local name because the context will be clear. Thus, when performing operations on entities that are registered to any particular compartment, it is not necessary to activate all global and local names. Rather, every referenced entity, whether local or non-local, can be identified using only the global names plus the local names for the entities that are registered to the particular compartment.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The illustrative embodiments will be better understood after reading the following detailed description with reference to the appended drawings, in which:

FIG. 1 depicts an exemplary global and local naming scheme;

DETAILED DESCRIPTION

Figure 2:
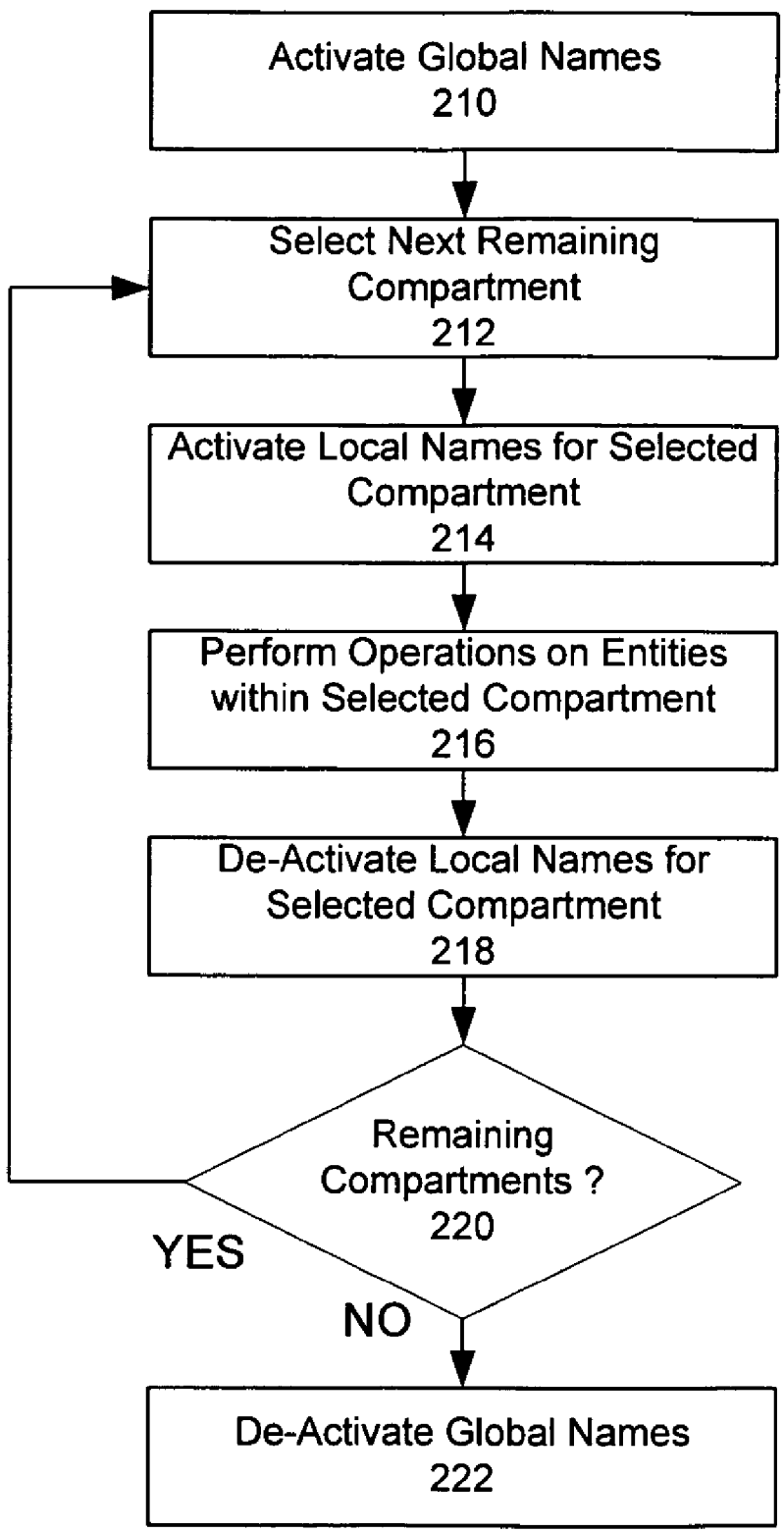
FIG. 2 depicts exemplary method for managing global and local names.

An exemplary global and local naming scheme is depicted in FIG. 1. By way of example and not limitation, the entities being assigned names in FIG. 1 are web pages. However, global and local names may be assigned to entities other than web pages. Also by way of example and not limitation, the naming scheme depicted in FIG. 1 involves entities that are registered to three different compartments: compartment-a, compartment-b, and compartment-c. The term "compartment," as used herein, refers to any collection of entities such as, for example, hosts, domains, entities that are located in the same geographic area, or any other collection of entities. Each web page that has the phrase "compartment-a" in its title is registered to compartment-a. Each web page that has the phrase "compartment-b" in its title is registered to compartment-b. Each web page that has the phrase "compartment-c" in its title is registered to compartment-c. To simplify this description, web pages whose titles include only the compartment name (i.e., www.compartment-a.com, www.compartment-b.com, and www.compartment-c.com) will be referred to as "homepages," while other web pages will be referred to as "secondary pages." As should be appreciated, however, homepages may include titles that are not identical to their corresponding compartment name.

Global name table 10 identifies global names for each global entity. A global entity is an entity that is referenced by one or more non-local entities. For example, suppose that the web page www.compartment-b.com has a uniform resource locator (URL) that points to the web page www.compartment-a.com. In this case, www.compartment-a.com, which is registered to compartment-a, is considered a global entity because it is referenced by www.compartment-b.com, which is registered to non-local compartment-b. Global web pages need not always be homepages. For example, www.compartment-a.com may point to a non-local secondary page such as www.compartment-b.com/page-b, thereby making that it a global entity and causing it to be included in global name table 10.

Global names are unique among all global entities. For example, www.compartment-a.com and www.compartment-b.com cannot both have the global name "1". The reasons for this will be explained below with reference to act 216 of FIG. 2. In FIG. 1, each entity is assigned a one digit numeric global or local name. However, global and local names may also include letters, numbers, symbols, any other characters, and any combination thereof. Additionally, global and local names may be any number of characters in length.

Local name tables 20*a*-*c* include local names for the entities registered to compartment-a, compartment-b, and compartment-c. In particular, local name table 20*a* includes local names for entities that are registered to compartment-a, local name table 20*b* includes local names for entities that are registered to compartment-b, and local name table 20*c* includes local names for entities that are registered to compartment-c. Each entity that is registered to one of compartment-a, compartment-b, and compartment-c will receive a local name—even if the entity is also assigned a global name. In FIG. 1, each homepage is assigned the local name "1". However, homepages need not necessarily receive the name "1".

As depicted in FIG. 1, unlike global names, local names need not be unique across all compartments. Rather, local names need only be unique among other local entities. For example, www.compartment-a.com/page-a and www.compartment-a.com/page-b cannot both have the local name "1" because they are both registered to compartment-a. However, by contrast, both www.compartment-a.com/page-a and www.compartment-b.com/page-a can have the local name "1" because they are registered to different compartments. The reasons for this will be explained below with reference to act 216 of FIG. 2.

An exemplary method for managing global and local names is depicted in FIG. 2. At act 210, global name table 10 is activated. Global name table 10 may be activated by retrieving it from secondary storage such as a hard disk or a database to active memory. Global name table 10 may also already be in active memory such as when, for example, it has been recently created or edited. At act 212, a next remaining compartment is selected on which to perform operations. For example, at act 212, compartment-a may be selected as the next compartment on which to perform operations. At act 214, the local name table corresponding to the selected compartment is activated. For example, if compartment-a is selected at act 212, then local name table 20*a* will be activated at act 214. A local name table 20 may be activated by retrieving it from secondary storage. A local name table 20 may also already be in active memory such as when, for example, it has been recently created or edited.

At act 216, operations are performed on entities within the selected compartment. Operations may include for example, page ranking, email delivery, or any other type of operation that may be performed on a set of entities. For example, if page ranking operations are being performed, then each web page that is registered to the selected compartment may be examined to determine whether it references any other web pages, and, if so, a score may then be propagated to those referenced web pages.

At this point in time, the data stored in active memory corresponds to the global names plus the set of local names corresponding to the selected compartment. This is because any entity that is referenced by an entity registered to the selected compartment can be identified using only the global names plus the set of local names corresponding to the selected compartment. In particular, any non-local entity that is referenced by an entity registered to the selected compartment will be a global entity that has a global name that is stored in active memory. For example, if www.compartment-a.com references www.compartment-b.com, then www.compartment-b.com can be identified by its global name "2", which is stored in global name table 10. Additionally, any local entity that is referenced by an entity registered to the selected compartment will have a local name that is stored in active memory. For example, if www.compartment-a.com references www.compartment-a.com/page-a, then www.compartment-a.com/page-a can be identified by its local name "2", which is stored in local name table 20*a*.

Thus, by employing the global and local naming scheme, the largest amount of memory that needs to be active at any single time corresponds to the number of global names plus the largest number of local names that are assigned to entities registered to any single compartment. For the exemplary scheme depicted in FIG. 1 in its current form, this means that the largest number of names that need to be stored in active memory is nine names, which is the current number of global names (four) plus the largest current set of local names (five) registered to compartment-c. As should be appreciated, this number is less than the current total number of names which would need to be stored in active memory using conventional entity naming schemes, which is equal to the current number of entities registered to all three compartments (twelve). For operations such as web page ranking, where the total number of named entities can exceed 20 billion, the global and local naming scheme can substantially reduce active memory requirements, substantially reduce the number of computers required to provide such active memory, and substantially simplify the distribution schemes required to access such computers.

The fact that only the local names for the entities registered to the selected compartment (and not all local names) are stored in active memory explains why, unlike global names, local names need not be unique across all compartments. This is because, when one entity references another local entity, the context is clear. For example, when www.compartment-a.com references www.compartment-a.com/page-a, then www.compartment-a.com/page-a will be identified using the local name "2". Although www.compartment-a.com/page-a is not the only entity that has the local name "2", the other entities that have the local name "2" are non-local entities that cannot be identified by www.compartment-a.com using their local names. By contrast, global entities can always be identified using their global names by both local and non-local entities. Thus, all global names must be unique.

The global and local naming scheme depicted in FIG. 1 is also advantageous because all entities that are registered to the same compartment may, although need not necessarily, be assigned local names in close proximity to one another. For example, in FIG. 1, entities that are registered to compartment-a have local names "1" through "3", entities that are registered to compartment-b have local names "1" through "4", and entities that are registered to compartment-c have local names "1" through "5". Thus, when a new entity is assigned a new local name, the new entity may be assigned the next incremental local name available for its compartment. For example, a new entity registered to compartment-a may be assigned the new local name "4," which is the next incremental name available for compartment-a. By contrast, in conventional naming schemes, entity names may not be grouped together by compartment. Therefore, in conventional naming schemes, the next available incremental name may not be in close proximity to other local entity names.

Returning to FIG. 2, at act 218, after operations are performed on the entities registered to the selected compartment, the local names corresponding to the selected compartment are deactivated. The local names may be deactivated by returning them from active memory to secondary storage. At act 220, it is determined whether there are any remaining compartments on which to perform operations. If so, then the method returns to act 212, where a next remaining compartment is selected. If there are no remaining compartments, then, at act 222, global name table 10 is deactivated. Act 222 is an optional act, as the global names may remain activated permanently or for any period of time after the method of FIG. 2 is completed.

Figure 3:
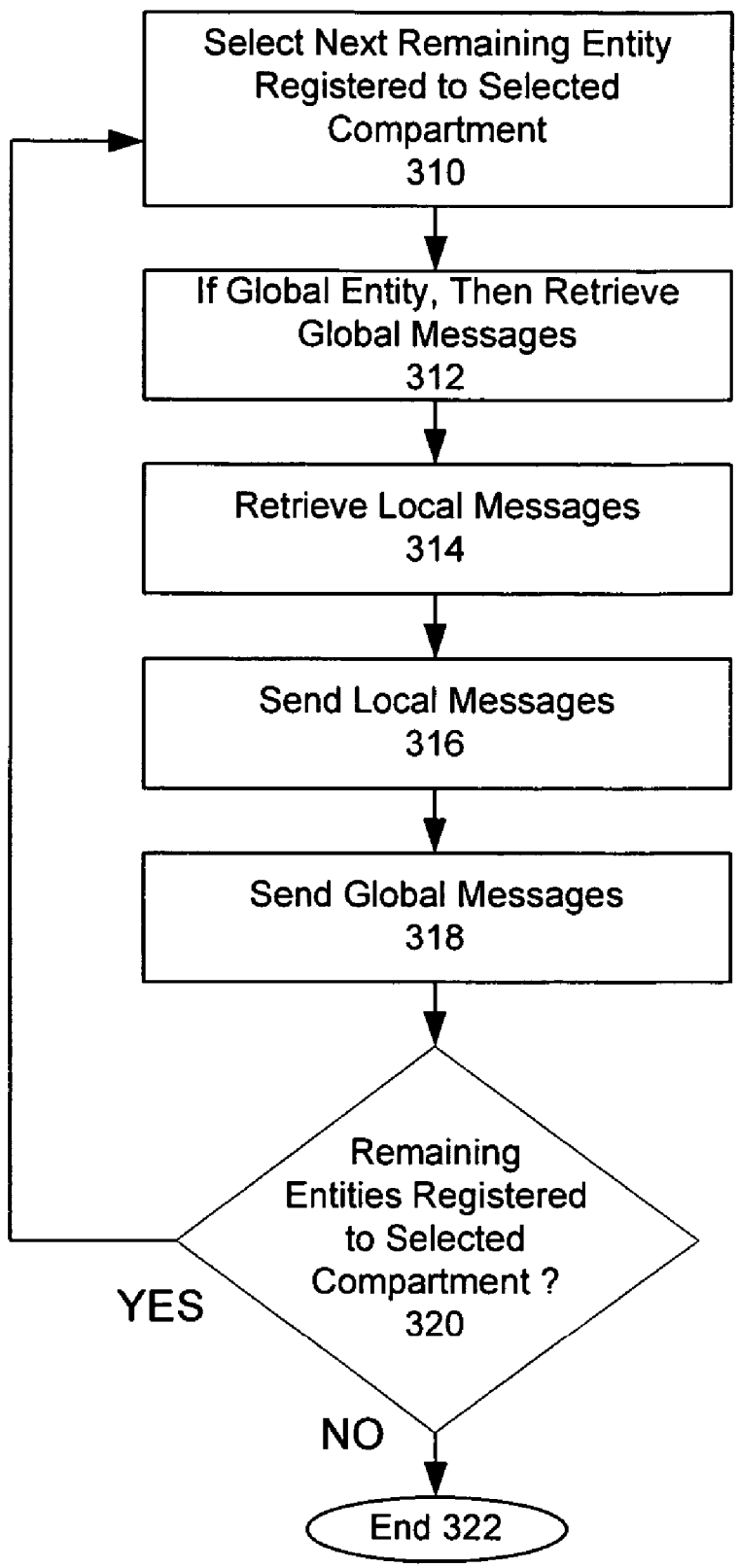
FIG. 3 depicts exemplary method for performing operations using global and local names.

An exemplary method for performing operations using global and local names is depicted in FIG. 3. The exemplary method of FIG. 3 is one possible method for performing act 216 of FIG. 2. The exemplary method of FIG. 3 involves the use of the terms "messages" and "boxes". The term "message," as used herein, refers to any data that is propagated from one entity to another. In particular, for web page ranking operations, the term "message" may refer to scores that are propagated from a referring page to a referenced page. The term message may also refer to email or any other kind of propagated data. The term "box," as used herein, refers to a portion of memory into which messages can be deposited and from which messages can be retrieved. A box may be, for example, a portion of random access memory (RAM). Each global name may identify a particular global box, while each local name may identify a particular local box. In particular, for web page ranking operations, scores can be propagated from a referring page to a referenced page by delivering the score to the referenced page's global or local box. If the referenced page is a local page, then the score will be delivered to the referenced page's local box, which is identified by its local name. By contrast, if the referenced page is a non-local page, then the score will be delivered to the referenced page's global box, which is identified by its global name.

At act 310, a next remaining entity that is registered to the selected compartment is selected. For example, if, at act 212 of FIG. 2, compartment-a is selected as the next compartment, then www.compartment-a.com (or any other entity that is registered to compartment-a) may be selected as the next entity at act 310. At act 312, if the selected entity is a global entity, then the selected entity's global messages are retrieved from the selected entity's global box, which is identified by its global name. The global messages will include messages that have been sent to the selected entity from other non-local entities. At act 316, the selected entity's local messages are retrieved from the selected entity's local box, which is identified by its local name. The local messages will include messages that have been sent to the selected entity from other local entities.

At act 316, local messages are sent from the selected entity to the local boxes of all local referenced entities. The local boxes for those local referenced entities can be identified by their local names, which will be stored in active memory. At act 318, global messages are sent from the selected entity to the global boxes of all non-local referenced entities. The global boxes for those non-local referenced entities can be identified by their global names, which will be stored in active memory. As should be appreciated, steps 312-318 need not necessarily be performed in the order in which are depicted in FIG. 3. At act 320, it is determined whether there are any remaining entities within the selected compartment. If so, then the method returns to act 310, where a next remaining entity is selected. If there are no remaining entities, then, at act 322, the performance of operations for the selected entity is concluded.

Figure 4:
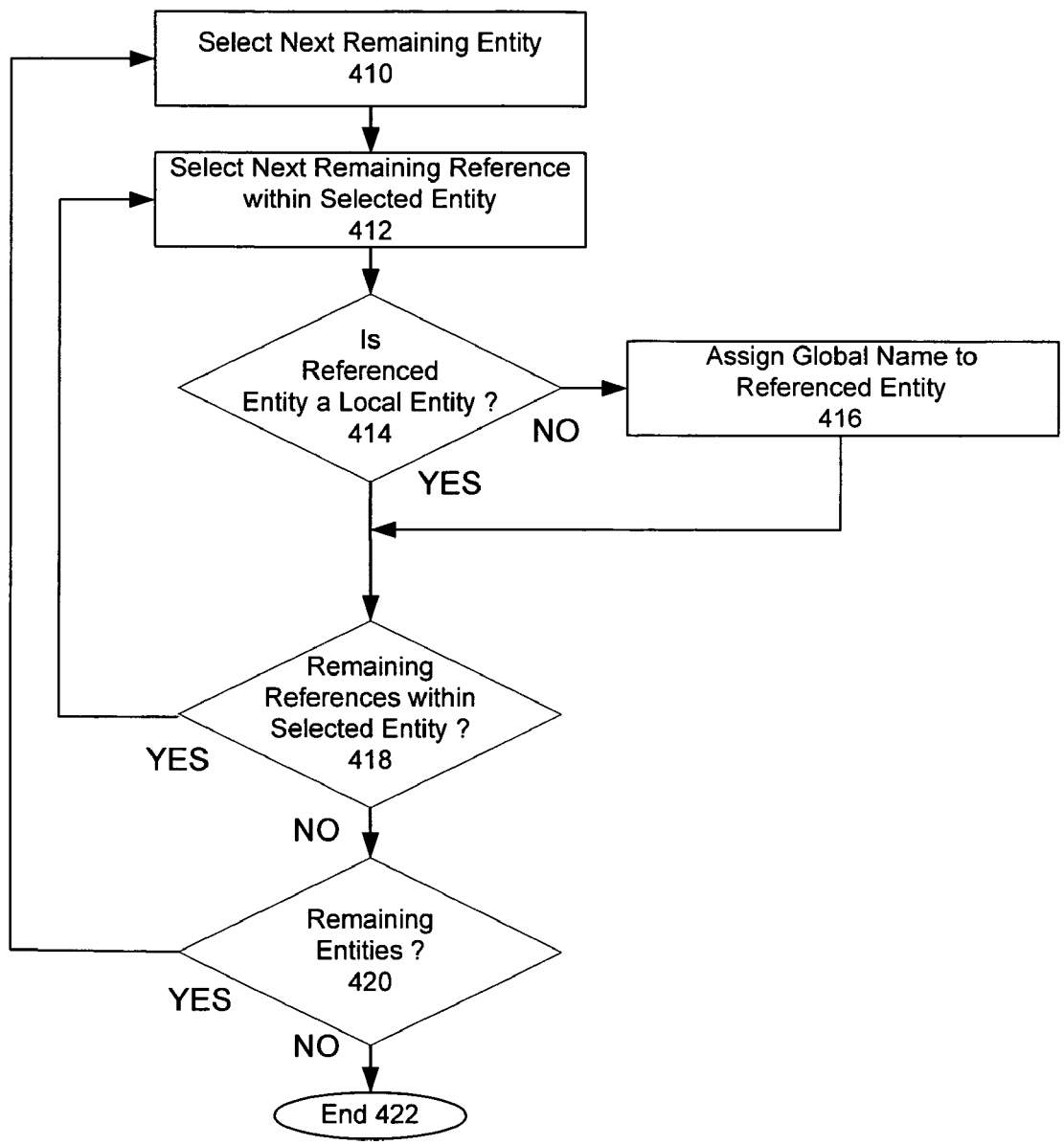
FIG. 4 depicts an exemplary method for assigning global names.

An exemplary method for assigning global names to a set of inter-compartment entities is depicted in FIG. 4. At act 410, a next remaining entity in the set of inter-compartment entities is selected. At act 412, a next remaining reference within the selected entity is selected. For example, for web page ranking operations, the next selected reference may be a URL within a selected web page. At act 414, it is determined whether the referenced entity is a local entity or a non-local entity. If the referenced entity is a non-local entity, then, at act 416, a global name is assigned to the referenced entity. In many instances, it may not be desirable to assign multiple global names to an entity. Thus, if the referenced entity already has a global name, then it may be desirable to skip step 416. At act 418, it is determined whether there are any remaining references within the selected entity. If so, then the method returns to act 412, where a next remaining reference is selected. If there are no remaining references within the selected entity, then, at act 420, it is determined whether there are any remaining entities within the inter-compartment set of entities. If so, then the method returns to act 410, where a next remaining entity is selected. If there are no remaining entities, then all current global entities have been assigned a global name and the method is concluded.

Figure 5:
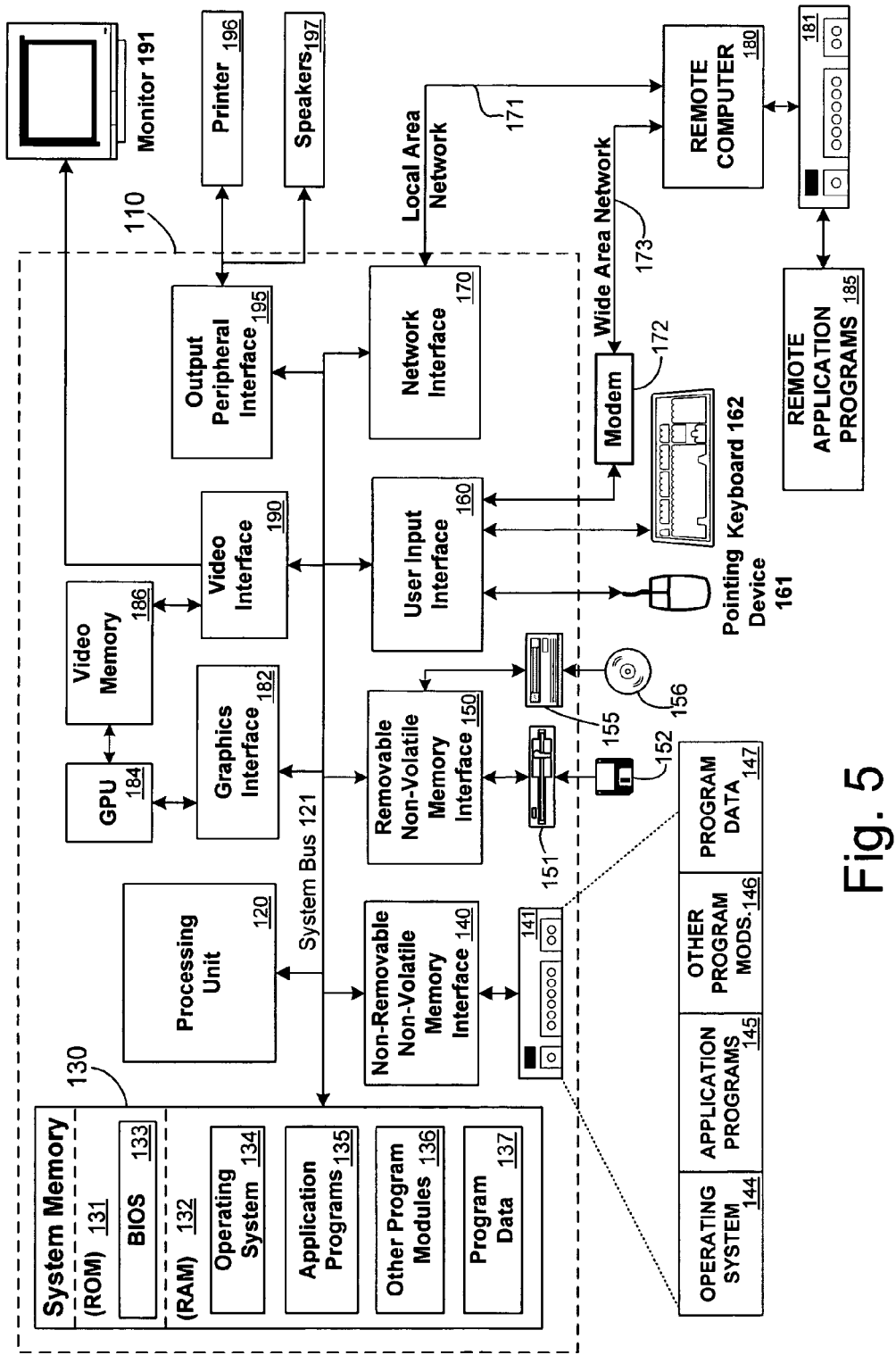
FIG. 5 is a block diagram representing an exemplary computing device.

FIG. 5 illustrates an example of a suitable computing system environment 100 in which the subject matter described above may be implemented. The computing system environment 100 is only one example of a suitable computing environment and is not intended to suggest any limitation as to the scope of use or functionality of the subject matter described above. Neither should the computing environment 100 be interpreted as having any dependency or requirement relating to any one or combination of components illustrated in the exemplary operating environment 100.

With reference to FIG. 5, computing system environment 100 includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 5 illustrates operating system 134, application programs 135, other program modules 136, and program data 137.

The computer 110 may also include other removable/non-removable, volatile/nonvolatile computer storage media. By way of example only, FIG. 5 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-RW, DVD-RW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 5 provide storage of computer readable instructions, data structures, program modules and other data for the computer 110. In FIG. 5, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, such as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182 may also be connected to the system bus 121. One or more graphics processing units (GPUs) 184 may communicate with graphics interface 182. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 5. The logical connections depicted in FIG. 5 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 5 illustrates remote application programs 185 as residing on memory device 181. It will be appreciated that the network connections shown are exemplary and other means of establishing a communications link between the computers may be used.

Although the subject matter has been described in language specific to the structural features and/or methodological acts, it is to be understood that the subject matter defined in the appended claims is not necessarily limited to the specific features or acts described above. Rather, the specific features or acts described above are disclosed as example forms of implementing the claims.

What is claimed is:

1. A computer-readable storage medium having computer-executable instructions for performing steps comprising:
    assigning a local name to each entity that is registered to one of a plurality of compartments;
    assigning a global name to each global entity that is registered to one of the plurality of compartments, each global entity being an entity that is referenced by another entity that is registered to a different compartment than the global entity;
    activating local names corresponding to entities that are registered to a first compartment of the plurality of compartments by retrieving the local names from a secondary storage device to an active memory, wherein the local names are not unique across the plurality of compartments;
    assigning identical local names to two entities that are registered to different ones of the plurality of compartments;
    performing operations on the entities registered to the first compartment; and
    deactivating the local names corresponding to the entities that are registered to the first compartment after the operations are performed by returning the local names from the active memory to the secondary storage device.

2. The computer-readable storage medium of claim 1 having further computer-executable instructions for repeating the activating, performing, and deactivating steps for each compartment in the plurality of compartments.

3. The computer-readable storage medium of claim 1 having further computer-executable instructions for performing the step of:

prior to activating the local names corresponding to entities that are registered to a first compartment of the plurality of compartments, activating global names corresponding to all global entities that are registered to one of the plurality of compartments by retrieving the global names from the secondary storage device to the active memory.

4. The computer-readable storage medium of claim 1, wherein performing operations comprises performing page ranking operations.

5. The computer-readable storage medium of claim 1, wherein each local name is unique to each compartment such that no two entities that are registered to a single compartment are assigned identical local names.

6. The computer-readable storage medium of claim 1, wherein each global name is unique to the plurality of compartments such that no two global entities within the plurality of compartments are assigned identical global names.

7. A computer-readable storage medium having computer-executable instructions for performing steps comprising:

activating a plurality of local names corresponding to a plurality of entities registered to a first compartment of a plurality of compartments, each local name identifying a corresponding local box, by retrieving the local names from a secondary storage device to an active memory, wherein the local names are not unique across the plurality of compartments, and wherein the local names corresponding to the plurality of entities registered to the first compartment comprise sequential numbers;

assigning identical local names to two entities that are registered to different ones of the plurality of compartments;

for a first entity of the plurality of entities registered to the first compartment:
 (a) sending a local message from the first entity to a local box of a local entity that is also registered to the first compartment;
 (b) sending a non-local message from the first entity to a global box of a non-local entity that is not registered to the first compartment;
 (c) retrieving a message from the local box of the first entity; and
 (d) if the first entity has a global box, then retrieving a message from the global box of the first entity;

repeating steps (a)-(d) for each remaining entity registered to the first compartment; and deactivating the local names corresponding to the entities registered to the first compartment by returning the local names from the active memory to the secondary storage device.

8. The computer-readable storage medium of claim 7 having further computer-executable instructions for performing the step of:

repeating the steps of claim 7 for each remaining compartment in a plurality of compartments.

9. The computer-readable storage medium of claim 8 having further computer-executable instructions for performing the step of:

prior to performing the steps of claim 8, activating global names corresponding to the plurality of compartments, each global name identifying a corresponding global box.

10. The computer-readable storage medium of claim 7 having further computer-executable instructions for performing the steps of:

assigning a local name to each entity registered to one of the plurality of compartments, each local name being unique to each compartment such that no two entities that are registered to a single compartment are assigned identical local names; and assigning a global name to each entity registered to one of the plurality of compartments that is referenced by at least one non-local entity, each global name being unique to the plurality of compartments such that no two entities within the plurality of compartments are assigned identical global names.

11. The computer-readable storage medium of claim 7, wherein each entity is a web page.

12. The computer-readable storage medium of claim 7, wherein sending a message comprises propagating a page ranking score from a referring entity to a referenced entity.

13. A method for global and local entity naming comprising:

assigning a local name to each entity that is registered to one of a plurality of compartments;

assigning a global name to each global entity that is registered to one of the plurality of compartments, each global entity being an entity that is referenced by another entity that is registered to a different compartment than the global entity;

activating by at least one computer processor local names corresponding to entities that are registered to a first compartment of the plurality of compartments by retrieving the local names from a secondary storage device to an active memory, wherein the local names are not unique across the plurality of compartments;

assigning by the at least one computer processor identical local names to two entities that are registered to different ones of the plurality of compartments;

performing by the at least one computer processor operations on the entities registered to the first compartment; and deactivating by the at least one computer processor the local names corresponding to the entities that are registered to the first compartment after the operations are performed by returning the local names from the active memory to the secondary storage device.

* * * * *